United States Patent [19]

Thorn

[11] Patent Number: 4,962,915

[45] Date of Patent: Oct. 16, 1990

[54] THREE-AXIS FLUID-FILLED MOUNT

[75] Inventor: Richard P. Thorn, Erie, Pa.

[73] Assignee: Lord Corporation, Erie, Pa.

[21] Appl. No.: 381,570

[22] Filed: Jul. 18, 1989

[51] Int. Cl.$^5$ ................................................. F16F 9/14
[52] U.S. Cl. .................................. 267/140.1; 267/35;
267/140.5; 267/219; 248/562
[58] Field of Search ............ 267/35, 140.1 A, 140.1 R,
267/140.1 AE, 140.1 C, 140.1 E, 140.5, 140.3,
140.4, 141, 141.1, 219; 248/562, 636

[56] References Cited

U.S. PATENT DOCUMENTS

| | | | |
|---|---|---|---|
| 2,295,829 | 11/1940 | Carlson | 267/141.1 |
| 2,540,130 | 1/1945 | Lee | 267/140.3 |
| 2,668,033 | 2/1954 | Lee | 267/140.3 |
| 3,721,417 | 3/1973 | Skala et al. | 267/140.1 |
| 3,874,646 | 4/1975 | Vernier | 267/140.1 |
| 4,262,886 | 4/1981 | Le Salver et al. | 267/140.1 X |
| 4,424,960 | 1/1984 | Dan et al. | 267/219 |
| 4,458,888 | 7/1984 | Wolf et al. | 267/140.1 |
| 4,460,168 | 7/1984 | Obadal | 267/140.5 X |
| 4,667,942 | 5/1987 | Bitschkus et al. | 267/140.1 |

OTHER PUBLICATIONS

"Understanding Hydraulic Mounts . . . ", Lord Corp., Tech article, Wallace C. Flower, LL-2166.

Primary Examiner—Matthew C. Graham
Attorney, Agent, or Firm—Howson and Howson

[57] ABSTRACT

A fluid-filled mount for damping vibrations imparted along X, Y and Z axes is disclosed. The mount has a rigid shell containing an elastomeric block into which is molded a connecting member and pairs of fluid chambers interconnected by conduits. When the connecting member is displaced relative to the shell, fluid is pumped through the conduits between the chambers.

13 Claims, 2 Drawing Sheets

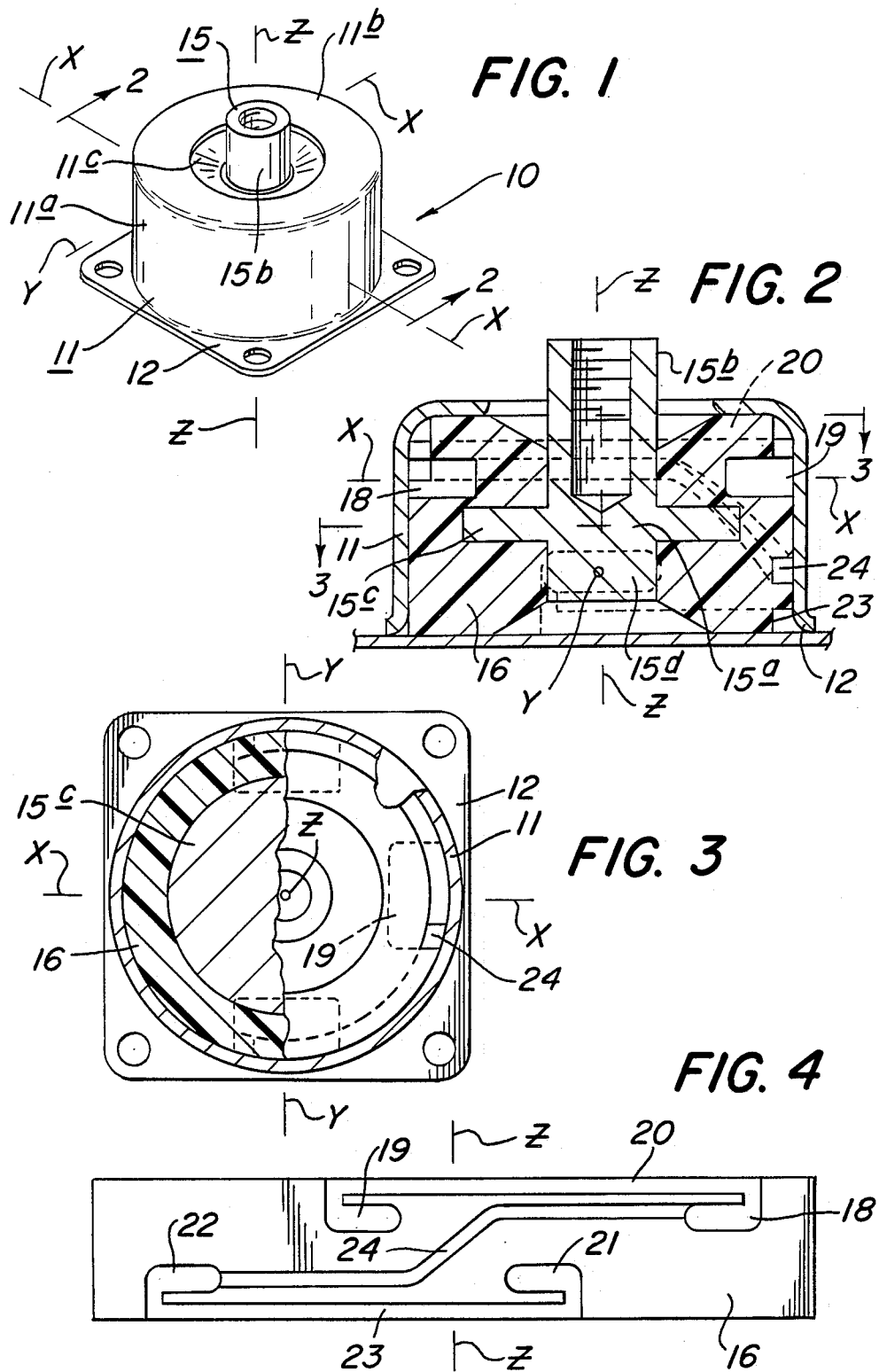

THREE-AXIS FLUID-FILLED MOUNT

FIELD OF THE INVENTION

The present invention relates to vibration isolators, and more particularly, the present invention relates to fluid-filled vibration isolators capable of damping vibrations along one or more of three orthogonal axes.

BACKGROUND OF THE INVENTION

Fluid-filled mounts for damping vibrations imparted on one axis have been known for quite some time. Such mounts generally include a fluid-filled pumping chamber in fluid communication with a receiving chamber via a conduit. The conduit may be sized and shaped to provide a fluid slug which resonates at a particular frequency to enable the stiffness of the mount to be controlled within a preselected frequency range. Such mounts have found particular utility in mounting engines in automobiles. An example of such a mount is disclosed in U.S. Pat. No. 4,712,777, owned by the assignee of the present application.

For applications requiring damping along two perpendicular axes, a fluid-filled isolator such as disclosed in U.S. Pat. No. 4,424,960 has been proposed. Such an isolator incorporates a pair of lateral fluid chambers in addition to a pair of vertical fluid chambers to damp vibrations both in a vertical direction and in a single horizontal direction. While this patented isolator may function satisfactorily for its intended purpose, there is a need for an isolator which can also damp vibrations imparted in three orthogonal directions such as for use in mounting avionics in aircraft. While various structures have been proposed for such purposes, such as described in U.S. Pat. Nos. 2,540,130; 2,295,829; 2,668,033; 3,721,417; 3,874,646, and 4,667,942 none of these patented mounts meets all of the requirements of a desirable multi-axis avionics mount.

OBJECT OF THE INVENTION

With the foregoing in mind, a primary object of the present invention is to provide a novel fluid-filled mount for damping vibrations imparted in multiple orthogonal directions.

Another object of the present invention is to provide an improved fluid-filled mount designed to damp vibrations imparted in three orthogonal directions, rendering it a particularly suited for use in mounting avionics equipment.

As a still further object, the present invention provides a relatively simple, multi-axis fluid-filled vibration isolator capable of being manufactured readily.

SUMMARY OF THE INVENTION

More specifically, the present invention provides a fluid-filled mount particularly suited for damping vibrations in several orthogonal directions. The mount comprises a shell adapted to be mounted to a first object, a connecting member having a portion disposed in the shell and adapted to be secured to a second object to mount it for motion relative to the first object, and resilient means between the connecting member and the shell defining first, second and third pairs of deformable fluid chambers. The chambers are located in spaced relation in each of the several directions, and a separate fluid conduit connects the fluid chambers in each of the pairs. Thus, when the connecting member moves in one direction relative to the shell, one of the fluid chambers contracts and displaces fluid therefrom into its companion chamber via the interconnecting fluid conduit. The fluid chambers are disposed in spaced relation on orthogonal axes and are arranged with respect to the connecting member so that only four chambers and three fluid conduits are needed to provide the desired damping action in three orthogonal directions.

BRIEF DESCRIPTION OF THE DRAWINGS

The foregoing and other objects, features and advantages of the present invention should become apparent from the following description when taken in conjunction with the accompanying drawings, in which:

FIG. 1 is a perspective view of a multi-axis vibration isolator embodying the present invention;

FIG. 2 is an enlarged transverse cross-sectional view taken on line 2—2 of FIG. 1;

FIG. 3 is a sectional view taken on irregular line 3—3 of FIG. 2;

FIG. 4 is a developed view of the circular periphery of the inner elastomeric element illustrated in FIG. 3 with the rightwardmost fluid chamber in FIG. 4 being located at the 9 o'clock position in FIG. 3 and the leftwardmost fluid chamber in FIG. 4 being located at the 6 o'clock position in FIG. 3;

DESCRIPTION OF THE PREFERRED EMBODIMENTS

Figure 5:
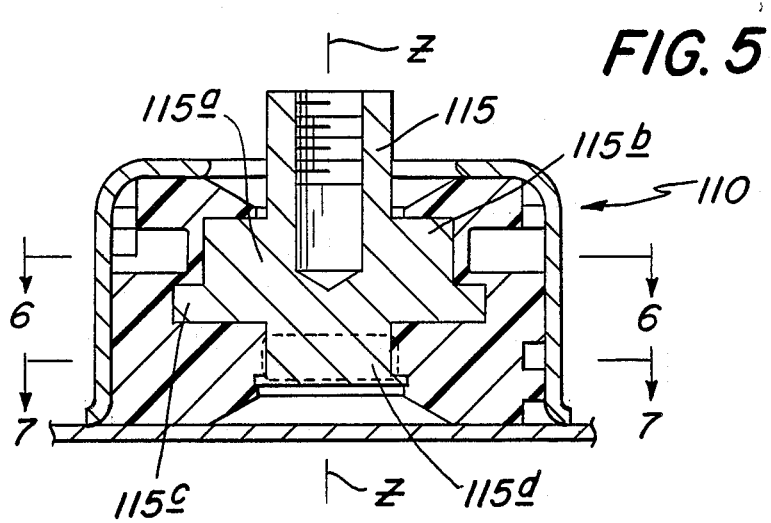
FIG. 5 is a sectional view similar to FIG. 2, but of a modified embodiment of the present invention.

Referring now to the drawings, FIG. 1 illustrates one embodiment of a fluid-filled vibration isolator, or mount, 10 constructed in accordance with the present invention. The mount 10 includes a two part shell which includes a cylindrical drawn cup 11 and a base 12 extending across the bottom of the cup 11. In the embodiment illustrated, the base 12 extends beyond the periphery of the cup 11 to provide a series of peripheral mounting holes enabling it to be mounted to a first object, such as an aircraft bulkhead. The cup 11 has a cylindrical peripheral sidewall 11a and an integral inturned end wall 11b extending substantially parallel with the base 12. The end wall 11b has a circular central aperture 11c formed therein, as by die punching. The sidewall 11a is secured to the base 12 by any suitable fluid-tight means, such as by adhesives, welding, clamping, or the like.

For the purpose of connecting another object, e.g. aircraft avionics, to the mount 10, a connecting member 15 is provided. As best seen in FIG. 2, the connecting member 15 has a body portion 15b disposed centrally within the confines of the shell cup 11 and an internally threaded tubular portion, or lug, 15a which projects centrally from the aperture 11c of the shell cup 11. The connecting member 15 is movably supported within the shell cup 11 by a mass of resilient material, such as the elastomeric block 16 illustrated in FIG. 2. Thus, when the connecting element 15 is connected to an object, such as an item of avionics in an aircraft, it can be displaced on X, Y or Z axes relative to the shell 11. Mounts of this general construction utilizing only a block of elastomeric material within the shell have been available, but they lack the capability of being able effectively to damp vibrations applied on the X, Y and Z axes between the connecting member 15 and the shell 11, without loss of static returnability.

According to the present invention, the mount 10 is capable of damping vibrations imparted along any one or more of the X, Y and Z axes which, it is noted, are disposed orthogonal to one another and which may, or may not, intersect at a common location. In FIG. 2, the Z axis is disposed vertically, passing centrally through the connecting member 15. The X axis is disposed horizontally and intersects the Z axes on the center line of the connecting member 15. The Y axis is also disposed horizontally, but extends perpendicular to the plane of the cross-section illustrated in FIG. 2. It also intersects the Z axis, but below the X axis in the illustrated embodiment.

For the purpose of damping vibrations imparted on or along the X axis, a first pair of fluid chambers are provided in the elastomeric block 16 between the connecting member body 15a and the sidewall 11a of the shell 11. The first pair of fluid chambers 18 and 19 are located on the X axis diametrically opposite one another on opposite sides of the connecting member body 15a. The fluid chambers 18 and 19 are fluidly interconnected by means of an elongate fluid channel 20 which extends in an arcuate path between the fluid chambers 18 and 19. Preferably, the fluid chambers 18 and 19, and their connecting conduit 20, are provided by recesses molded in the body of the elastomeric element 16 which, when juxtaposed in the shell 11, are fluid tight.

A second pair of fluid chambers 21 and 22 are similarly provided on the Y axis adjacent the base 12 of the mount 10. The second pair of fluid chambers 21 and 22 are fluidly interconnected by an elongate arcuate flow conduit 23, much like the conduit 20. The second pair of fluid chambers 21 and 22 are located in a second plane offset vertically from the plane in which the first pair of fluid chambers 18 and 19 are located. The second pair of fluid chambers 21 and 22 are located on diametrically opposite sides of the connecting member body 15a on the Y axis which is perpendicular to the X axis. Thus, the fluid chamber 18 in the first pair is located at a higher level along the Z axis than the fluid chamber 22 in the second pair.

The fluid chamber 18 in the first pair and fluid chamber 22 in the second pair combine to form a third pair of fluid chambers spaced apart on the Z axis. Like the aforedescribed pairs of fluid chambers, the fluid chambers 18 and 22 are molded in the periphery of the elastomeric element and are interconnected by an elongate fluid conduit 24. Like the other conduits 20 and 23, the conduit 24 is provided by a recess molded in the periphery of the elastomeric element 16. See FIG. 4. Thus, there are defined first, second and third pairs of connected fluid chambers, but there are a total of only four chambers and three connecting conduits.

Fluid is pumped through the conduits 20-24 in response to motion of the connecting member 15 relative to the shell 11. To this end, the body 15a of the connecting member 15 has a configuration which cooperates with the resilient block 16 and shell 11 to provide the desired fluid pumping action for the arrangement of chambers illustrated in the embodiments of FIGS. 1-4. As best seen in FIG. 2, the connecting member 15 is characterized by an inverted cruciform longitudinal cross-sectional configuration which is defined by the upstanding lug 15b and a circular flange 15c extending transversely of the Z axis substantially centrally of the mount 10. The connecting member 15 also has a depending cylindrical boss 15d located below the plane of the flange 15c. Thus, when the mount is in its home or undisplaced position illustrated in FIG. 2, the upstanding lug portion 15b of the connecting member 15 extends orthogonal to a horizontal plane through the axis X.

When the connecting member 15 is displaced such that its lug portion 15b moves rightward, fluid in the chamber 19 is pressurized and displaced counterclockwise (FIG. 3) into its companion fluid chamber 18. Displacement of the connecting member 15 leftward causes its lug 15b to pressurize fluid in the chamber 18 and to displace it clockwise (FIG. 3) into its companion chamber 19. Similarly, displacement of the connecting member 15 rearward into the plane of the sheet (upward in FIG. 3), causes the boss 15d to move toward the fluid chamber 21. This causes fluid therein to be pressurized and displaced through the conduit 23 into its companion fluid chamber 22. Conversely, displacement of the connecting member 15 in the opposite direction, i.e. out of the plane of the sheet toward the viewer (downward in FIG. 3), causes fluid in the chamber 22 to be pressurized and displaced in the opposite direction through the conduit 23 to its companion chamber 21. When the connecting member 15 is displaced vertically, i.e. along the Z axis, its flange 15c moves upwardly and causes fluid in both the upper chambers 18 and 19 to be pressurized by a like amount, thereby causing fluid to flow through the conduit 24 into the lower chambers 21 and 22. Conversely, displacement of the connecting member downwardly causes its flange 15c to pressurize the fluid contained in the lower chambers 21 and 22 and thereby to flow it through the conduit 24 into both of the upper chambers 18 and 19. Thus it may be seen that with only four chambers and three interconnecting conduits, fluid can be flowed, and motion of the connecting member damped, along one or more of three orthogonal axis.

As well known in the art of designing fluid mounts, the damping provided by the mounts can be predetermined by a variety of design techniques, including appropriate sizing of the fluid conduits which interconnect opposed pumping chambers; however, for a more thorough understanding of the factors to be considered in designing details of fluid mounts, reference is made to *Understanding Hydraulic Mounts for Improved Vehicle Noise, Vibration and Ride Qualities* by Wallace C. Flower, SAE Technical Paper Series, No. 850975, May 1985, the disclosure of which is incorporated by reference herein. In the embodiments of FIGS. 1-4, the mass of resilient material 16 in the block surrounding the connecting member 15 may provide slightly more stiffness than desired for some applications. In applications requiring lower stiffness, or in applications requiring a different amount of stiffness for different directions of desired damping, another embodiment of the present invention is provided. In this embodiment which is indicated by the reference numeral 110 and illustrated in FIGS. 5-7, the configuration of the shell, pumping chambers and connecting conduits is the same as the preceding embodiment. However, in this embodiment the body portion 115a of the connecting member 115 is provided with a pair of oval pistons, or shapes 115b and 115d which have their major axes disposed at right angles with one another and which are located in different horizontal planes. Thus, as best seen in FIG. 6, the upper shape 115b is disposed with its major axis extending along the X axis between the upper pumping chambers 118 and 119. The upper shape 115b extends into close proximity with each chamber and is separated from each chamber by a relatively thin wall portion 116' of the block of elastomeric material 116. The lower shape 115d is similarly configured and is disposed with its major axis extending on the Y axis between the fluid chambers 121 and 122 to provide relatively thin flexible walls 116" between the opposite ends of the lower shape 115d and the lower fluid chambers 121 and 122. As in the preceding embodiment, the connecting member 115 also has a circular flange 115c which extends horizontally in the resilient block 116 in a plane between the upper pair of fluid chambers 118 and 119 and the lower pair of fluid chambers 121 and 122.

Figure 6:
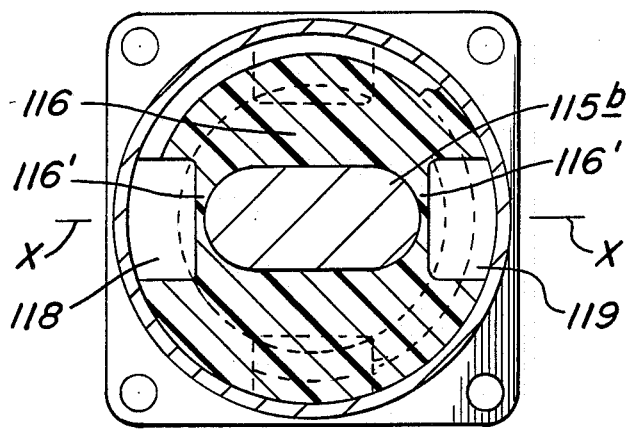
FIG. 6 is a sectional view taken on line 6—6 of FIG. 5.
Figure 7:
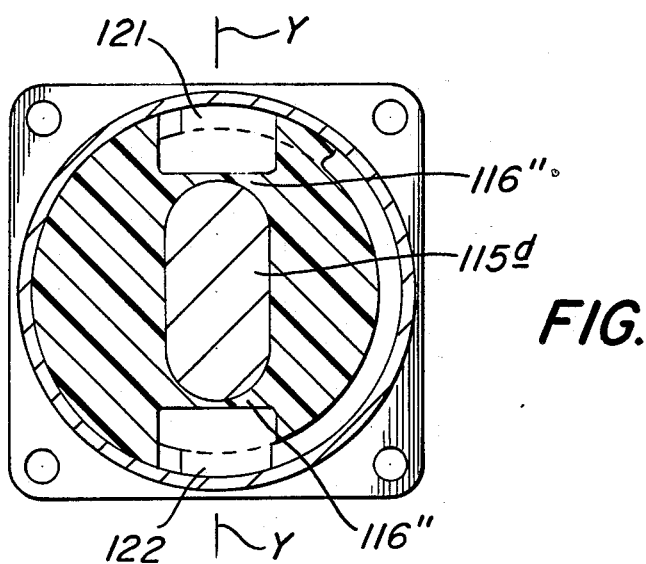
FIG. 7 is a sectional view taken on line 7—7 of FIG. 5.

The embodiment illustrated in FIGS. 5–7 functions in essentially the same manner as the embodiment of FIGS. 1–4, except that the oval shapes 115b and 115d cooperate with the thinner wall portions 116' and 116" respectively, to cause fluid in the upper and lower chambers to be pressurized more readily in response to relatively small displacements along the X and Y axes. Of course, should it be desired to provide a different level of stiffness on the X axis than on the Y axis, the extent of either shape 115c or 115d on its major axis could be varied to increase the thickness of the wall separating the fluid chambers on either X or Y axis. For instance, the shape 115b could be made shorter in the X axis direction relative to the shape 115d in the Y axis direction in order to provide X axis pumping stiffness which is lower than Y axis stiffness.

Assembly of the mounts 10 and 110 is straightforward. The connecting members 15 and 115 are molded into resilient blocks 16 and 116, and the blocks 16 and 116 are slid axially along the Z axis into their respective shells. This can be accomplished while submerged in a fluid bath. This causes the fluid chambers and connecting conduits to be filled before the base plate is secured to the shell. If desired, the parts can be assembled, and the fluid charged through a sealable port in the sidewall of the shell.

In view of the foregoing, it should be apparent that the present invention now provides a fluid-filled mount capable of damping motion in one or more of three orthogonal directions. The mount has a minimum of components, rendering it straightforward to manufacture. Furthermore, the mount is designed to enable different degrees of stiffness to be incorporated in different directions.

While preferred embodiments of the present invention have been described in detail, various modifications, alterations and changes may be made without departing from the spirit and scope of the present invention as defined in the appended claims.

I claim:

1. A fluid-filled mount for damping vibrations in at least three orthogonal directions, comprising:
   a shell adapted to being mounted to a first object,
   a connecting member at least partially disposed in said shell and adapted to being secured to a second object for movement relative to said first object,
   means defining between said connecting member and said shell a plurality of pairs of resiliently deformable fluid chambers located in spaced relation in each of said orthogonal directions, and
   means providing separate first, second and third fluid conduits connecting the fluid chambers in each of said pairs so that displacement of the connecting member in one direction of motion causes one of the fluid chambers along said direction to contract and to displace fluid therefrom into its companion fluid chamber,
   whereby relative motion between the objects can be damped in at least one direction.

2. A fluid-filled mount according to claim 1 wherein said fluid chamber total four in number.

3. A fluid-filled mount according to claim 1 wherein at least a first one of said pairs of chambers is located in a first plane located in a first one of said directions and another of said pairs of chambers is located in a second plane located in the second one of said directions and offset from said first plane in the third one of said directions.

4. A fluid-filled mount according to claim 1 wherein said fluid chambers in said first pair of fluid chambers are located diametrically opposite one another on a first axis and said second pair are located diametrically opposite one another on a second axis with said first and second axes being perpendicular to one another.

5. A fluid-filled mount according to claim 1 including a resilient element mounted between said connecting member and said shell, and wherein said fluid chambers and each conduit are defined by recesses formed in the periphery of said resilient element adjacent the shell.

6. A fluid-filled mount according to claim 1 wherein said connecting member has at least one shaped extension thereon extending into close proximity with at least one of said pair of fluid chambers.

7. A fluid-filled mount according to claim 1 including a pair of shaped extensions on said connecting member, each being elongated and extending into proximity with the fluid chambers in each pair of chambers.

8. A fluid-filled mount for damping vibrations in at least three orthogonal directions, comprising:
   a shell adapted to being mounted to a first object,
   a connecting member at least partially disposed in said shell and adapted to being secured to a second object for movement relative to said first object,
   resilient means in said shell mounting said connecting member for motion on orthogonal axes extending in said directions, said resilient means defining between said connecting member and said shell a plurality of pairs of deformable fluid chambers, said fluid chambers in each pair having at least portions thereof disposed in a path of movement of said connecting member on said axes, and
   means providing first, second and third discrete fluid conduits fluidly interconnecting the fluid chambers in each of said pairs so that motion of the connecting member in one direction causes one of the fluid chambers in said direction to displace fluid through said conduit into its companion fluid chamber,
   whereby relative motion between the objects can be damped in at least one direction.

9. A mount according to claim 8 wherein said resilient means includes a block of elastomeric material having said fluid chambers and fluid conduits formed in its periphery in juxtaposition with said shell.

10. A mount according to claim 9 wherein said connecting element has a body portion extending in one path of movement and a flange extending laterally from said body portion in another path of movement, and one of said fluid chambers is located on one side of said flange and its companion fluid chamber is located on the other side of said flange and is in fluid communication therewith via said third conduit.

11. A mount according to claim 10 wherein said other fluid chambers are located in separate planes and on axes perpendicular to one another with one pair above said flange being in fluid communication via said first conduit and the other pair below said flange being in fluid communication via said second conduit.

12. A fluid-filled mount for damping vibrations in at least three orthogonal directions comprising:

a shell adapted to being mounted to a first object, a connecting member at least partially disposed in said shell and adapted to being secured to a second object for movement relative to said first object, means defining between said connecting member and said shell at least a first and a second pair of resiliently deformable fluid chambers located in spaced relation in each of said orthogonal directions with portions disposed on opposite sides of said connecting member, and fluid conduit means providing fluid communication between the fluid chambers in each of said pairs so that displacement of the connecting member in one direction of motion causes one of the fluid chambers along said direction of motion to displace fluid therefrom into its companion fluid chamber on the opposite side of said connecting element, said first pair of fluid chambers being located in a first plane and said second pair of fluid chambers being located in a second plane parallel to said first plane, said first and second pairs of fluid chambers totaling four in number, and said conduit means including a first discrete conduit separately interconnecting said first pair of fluid chambers, a second discrete conduit separately interconnecting said second pair of fluid chambers, and a third discrete conduit separately interconnecting one fluid chamber in said first pair with one fluid chamber in said second pair, whereby relative motion between the object can be damped in at least one direction.

13. A fluid-filled mount according to claim 12 wherein said connecting member has a pair of oval shaped extensions disposed with their major axes extending between opposed pairs of said fluid chambers and into proximity therewith.

* * * * *